US012764245B2

(12) United States Patent
Schuppan et al.

(10) Patent No.: US 12,764,245 B2
(45) Date of Patent: Oct. 13, 2026

(54) METHOD AND APPARATUS FOR AI-BASED IMAGE CLASSIFICATION FOR COLOR MANAGEMENT IN PRINTING

(71) Applicant: Fiery, LLC, Fremont, CA (US)

(72) Inventors: Holger Schuppan, Bottrop (DE); Mario Kuehn, Duisburg (DE)

(73) Assignee: FIERY, LLC, Fremont, CA (US)

( * ) Notice: Subject to any disclaimer, the term of this patent is extended or adjusted under 35 U.S.C. 154(b) by 258 days.

(21) Appl. No.: 18/620,939

(22) Filed: Mar. 28, 2024

(65) Prior Publication Data

US 2025/0310466 A1 Oct. 2, 2025

(51) Int. Cl.
*H04N 1/60* (2006.01)

(52) U.S. Cl.
CPC ......... *H04N 1/6072* (2013.01); *H04N 1/6019* (2013.01); *H04N 1/6058* (2013.01)

(58) Field of Classification Search
CPC ................. H04N 1/6019; H04N 1/6058–6072
See application file for complete search history.

(56) References Cited

U.S. PATENT DOCUMENTS 5,978,107 A * 11/1999 Murai .................... H04N 1/603 358/518
7,760,398 B2 * 7/2010 Kawai .................. H04N 1/6019 358/1.9
8,593,693 B2 * 11/2013 Qiao ...................... H04N 1/603 358/1.16
11,023,791 B2 * 6/2021 Chang .................... G06N 3/084
12,034,903 B1 * 7/2024 Schuppan ................ H04N 1/54
2011/0141497 A1 6/2011 Willamowski et al.
2012/0019843 A1 1/2012 Kishimoto
2015/0251444 A1 9/2015 Sayama et al.
2017/0054877 A1 2/2017 Shibata
2020/0267334 A1 8/2020 Cyrus
2025/0142014 A1 * 5/2025 Schuppan ................. G06T 7/90

FOREIGN PATENT DOCUMENTS

CN 121746226 A * 3/2026

OTHER PUBLICATIONS

International Search Report from the ISA dated Jul. 11, 2025 for PCT/US2025/021338 (Year: 2025).*

"ECO3 Arkitex ItelliTune—Image optimization software for newspapers", retrieved online from url: https://www.agfa.com/printing/products/arkitex-intellitune/; copyright 2024, 5 pages.

* cited by examiner

*Primary Examiner* — Scott A Rogers
(74) *Attorney, Agent, or Firm* — PERKINS COIE LLP

(57) ABSTRACT

Automated selection of a best gamut mapping strategy for a given element of the print job adapts the color management process to manage all important elements and quality criteria for all content elements of a print product to produce an optimal print product. Criteria which have a lower priority for a particular content are compromised. Accordingly, optimal image quality is achieved for every content element and printer color management settings are simplified.

2 Claims, 10 Drawing Sheets

METHOD AND APPARATUS FOR AI-BASED IMAGE CLASSIFICATION FOR COLOR MANAGEMENT IN PRINTING

FIELD

Various of the disclosed embodiments concern a method and apparatus for artificial intelligence (AI) based image classification for color management in printing.

BACKGROUND

In printing it may not always be possible to print all colors exactly as they are in the original image. One reason for this is that the printable color gamut of a printing device is restricted compared to the color gamut of the original color space. Each element of a print product, e.g. the artwork, images, and/or illustrations, has specific needs to achieve maximum print quality. To do so within these constraints, the print data preparation process for optimal print results with any content must be adapted to the content of the print job.

Currently, it is necessary to decide upon a method/strategy of how to map the color gamut of the original image to the color gamut of the printing press. If an ICC based color management system is used, either a default setting for all elements of a print job is used, which delivers an average quality for all printing jobs, or manual intervention is used that requires a certain knowledge about color management, e.g. which ICC profile rendering intent contains which gamut mapping strategy. Unfortunately, due to ICC profile limitations, only limited different rendering intent strategies are available.

SUMMARY

Embodiments of the invention address the above mentioned dilemma by automated selection of a best gamut mapping strategy for a given element of the print job. Embodiments of the invention adapt the color management process to manage all important elements and quality criteria for all content elements of the print product to produce an optimal print product. Criteria which have a lower priority for a particular content are compromised. Accordingly, optimal image quality is achieved for every content element and printer color management settings are simplified.

DETAILED DESCRIPTION

Figure 1:
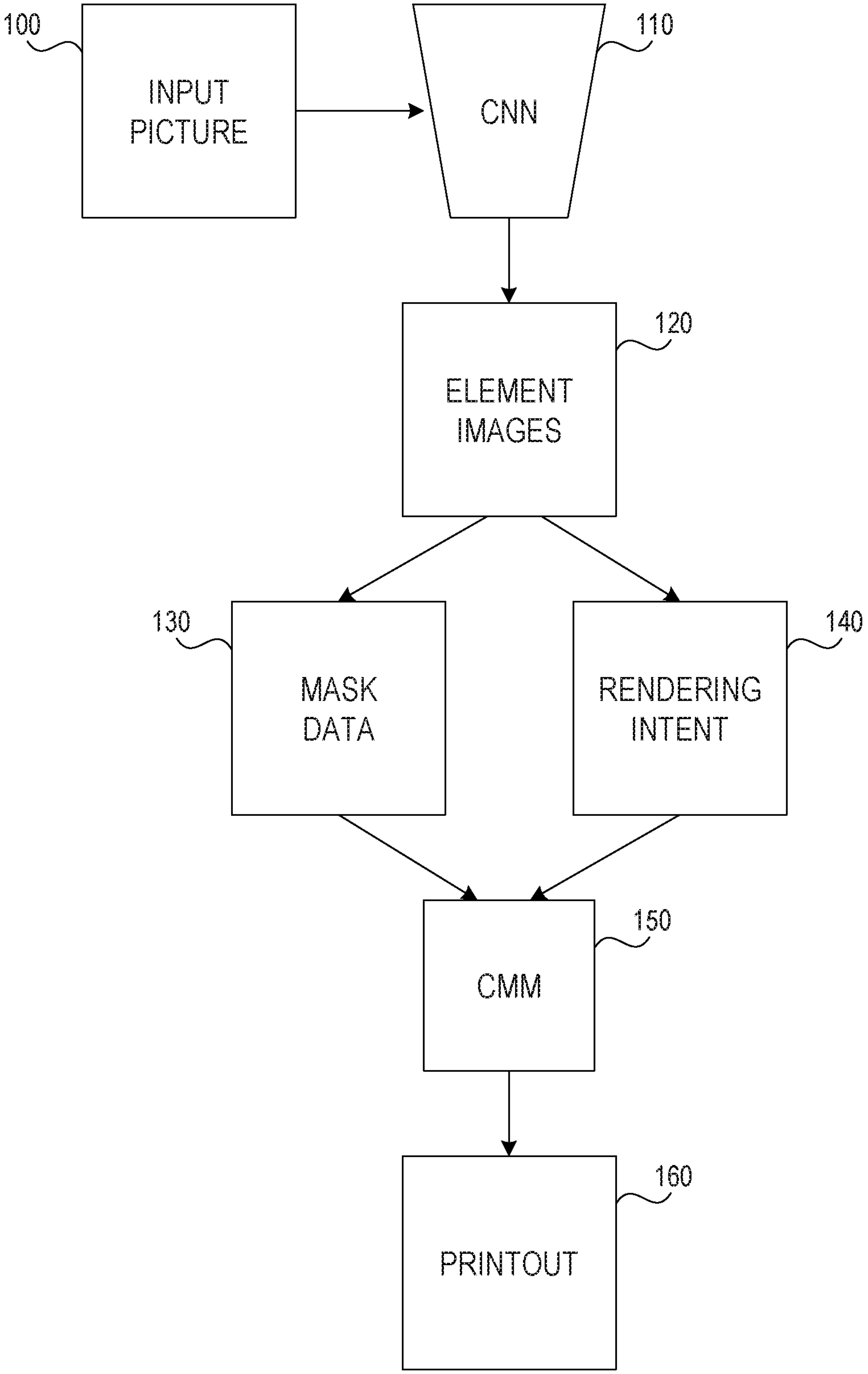
FIG. 1 is a flow diagram showing a method and apparatus for AI based image classification for color management in printing according to embodiments of the invention.

Embodiments of the invention provide automated selection of a best gamut mapping strategy for a given element of a print job. Embodiments of the invention adapt the color management process to manage all important elements and quality criteria for every content elements of the print product to produce an optimal print product. Criteria which have a lower priority for a particular content are compromised. Accordingly, optimal image quality is achieved for every content element and printer color management settings are simplified.

Packaging a specific rendering aim into, e.g. an ICC profile CLUT, implies the need to define, for example a strategy how to handle source colors outside of the printable area of the destination device. As an example, if maximum print accuracy is the aim, the colors are mapped to the closest printable color (minimum Delta E). This leads to a CLUT, where multiple out of gamut colors are mapped to the same point at the gamut surface. In the print production these colors are represented with the same printed color and the user cannot differentiate between them. Images printed with such a rendering lose dynamic range and differentiation. However, while printing brand colors, the most accurate color representation matters more and the minimum Delta E is not satisfactory.

Embodiments of the invention concern automatic content analysis of every print job where differentiation is required between jobs which either need to use the minimal Delta E approach or rather should not use it. While many such content related requirements exist, embodiments of the invention find application for all of them.

Digital front ends (DFEs) such as those manufactured by Fiery (https://www.fiery.com/) include a very comprehensive suite of color management settings. The user can tailor the rendering chain manually in a very detailed manner. Embodiments of the invention take over this decision making process to optimize the resulting color output. As a result, working with the DFE is much safer and significantly easier. A full-automatic mode can replace the manual job, data analysis, and file processing setup process.

Beside the detection and categorization of the print job content, a specific CLUT has to be created, either dynamically or statically. In the latter case this CLUT is stored and the print data creation process accesses it accordingly. This requires a specific linking between the supported rendering aims, the creation process, and the processing process.

Some or even most of the print products are a mixed form including, e.g. landscape and images with skin tones. Embodiments of the invention quantify these elements and pick the best suited rendering based on this evaluation result. In embodiments AI image detection technology is used to determine the main content of the image. These routines can detect many different types of image elements such as landscape, people, cars but also sub-elements such as text or barcodes. The rendering aim for such detectable elements or sub-elements must defined either by the DFE or by the user. The DFE then links the suited rendering to the detected content of the print job automatically. This system is flexible and extendable in regards to the detectable content, as well as to the rendering methods.

Embodiments of the invention also detect and mask elements within the print job by application of an AI based segmentation algorithm to create image masks for the different categories and apply individual color management to these masked areas. A tailored rendering is deployed using a specific rendering for each group of elements. Adequate blending routines deliver smooth transitions between different rendering procedures. The blending between two or more different rendering methods can be done using many different methods. One possibility is a linear blending between the color results of one method to the different results of the second method. This can be applied in conjunction to the specific image content, e.g. more rapidly if a transition is going into a shadow area or more smoothly in light tonal areas. Those skilled in the art will appreciate that there are many ways possible.

In addition to object type dependent color rendering, embodiments of the invention can be used outside of the color management domain to produce a best print product. For example, if the image analysis detects, e.g. barcodes or very fine text elements, additional sharping or specific scaling routines can be used to optimize the print quality for such parts as well. In embodiments of the invention, methods such as unsharp masking can be used for this purpose. Other methods may include noise reduction, GCR (gray component replacement by black ink or toner), or printing with a spot color or special color.

Many production jobs are a composition from multiple images. Embodiments of the invention can be applied to any of these individual images. The content of the image is detected individually and a specific rendering is applied individually to it. For example the Fiery (https://www.fiery-.com/) can render each element of a print job, e.g. a PDF file, individually.

In an alternative embodiment of this invention, the specific source to destination transformation can be applied in a specific conversion routine, inside or outside of the ICC standard. For example, embodiments of the invention define rendering aims for every component of a PDF or other file directly based on the content of the image. Because of this, it is possible to render one element of the PDF job in a specific way, e.g. for landscape rendering with natural and bright colors, while another element of the PDF job is rendered differently e.g. for very accurate reproduction of very fine elements. As previously discussed, PDF can include many images. Each image is analyzed individually, and each has its individual rendering depending on the detected content.

FIG. 1 is a flow diagram showing a method and apparatus for AI-based image classification for color management in printing according to the invention. Image classification is a typical AI application. It is performed by a neural network that was trained to identify certain types of objects (cars, bicycles, dogs, traffic lights, etc.) on an image.

Embodiments of the invention comprise the following modules:

An application that creates ICC color profiles or similar, containing color lookup tables (CLUTs) that describe the gamut mapping of input colors to output colors. The CLUTs are created for different applications, e.g. a table for best reproduction of photographic images, others for office applications, best numerical color match, technical equipment, people, nature, etc. The process for ICC LUT generation can imply the same general processing steps but it can also include a definition of the steps, e.g. what rendering aims are added, how is the gamut mapping handled, how are inner gamut colorants handled, etc. CLUTs can be also completely specialized. For example, a standard processing schema can be displayed highlighting that the content of each step is completely flexible and tailored to the specific needs for the individual objects or object types.

Figure 2:
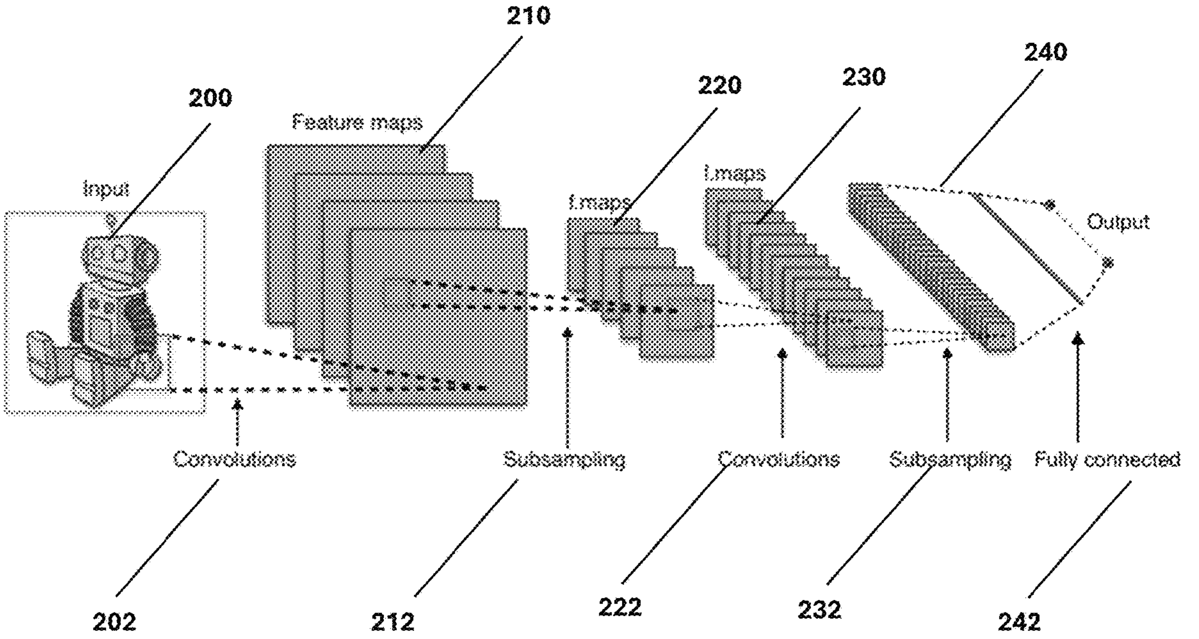
FIG. 2 is a flow diagram that shows the use of a CNN according to an embodiment of the invention.

A convolutional neural network (CNN) that is trained to perform image classification and object detection and that then analyzes and tags images to be printed or that masks part of the image to be printed with a classification category. FIG. 2 is a flow diagram that shows the use of a CNN according to an embodiment of the invention. In FIG. 2, a convolution filter 202 is applied to an input image 200. Repeated application of the same filter to the input results in a feature map 210, indicating the locations and strength of a detected feature in the input, such as an image. The feature map 210 summarizes the presence of detected features in the input image. The innovation of convolutional neural networks is the ability to automatically learn a large number of filters in parallel specific to a training dataset under the constraints of a specific predictive modeling problem, such as image classification. The result is highly specific features that can be detected anywhere on input images. As shown in FIG. 2, the feature maps are subsampled 212 resulting in further feature maps 220 which are, in turn, convolutionally filtered 222, resulting in further feature maps 230 which are subsampled 232 to produce an output 240 that is fully connected 242.

A convolutional neural network (CNN) is a regularized type of feed-forward neural network that learns feature engineering by itself via filters (or kernel) optimization. Vanishing gradients and exploding gradients, seen during backpropagation in earlier neural networks, are prevented by using regularized weights over fewer connections. For example, for each neuron in the fully-connected layer 10,000 weights would be required for processing an image sized 100×100 pixels. However, applying cascaded convolution (or cross-correlation) kernels, only 25 neurons are required to process 5×5-sized tiles. Higher-layer features are extracted from wider context windows, compared to lower-layer features. A convolutional neural network consists of an input layer, hidden layers and an output layer. In a convolutional neural network, the hidden layers include one or more layers that perform convolutions. Typically this includes a layer that performs a dot product of the convolution kernel with the layer's input matrix. This product is usually the Frobenius inner product, and its activation function is commonly ReLU. As the convolution kernel slides along the input matrix for the layer, the convolution operation generates a feature map, which in turn contributes to the input of the next layer. This is followed by other layers such as pooling layers, fully connected layers, and normalization layers.

Figure 3:
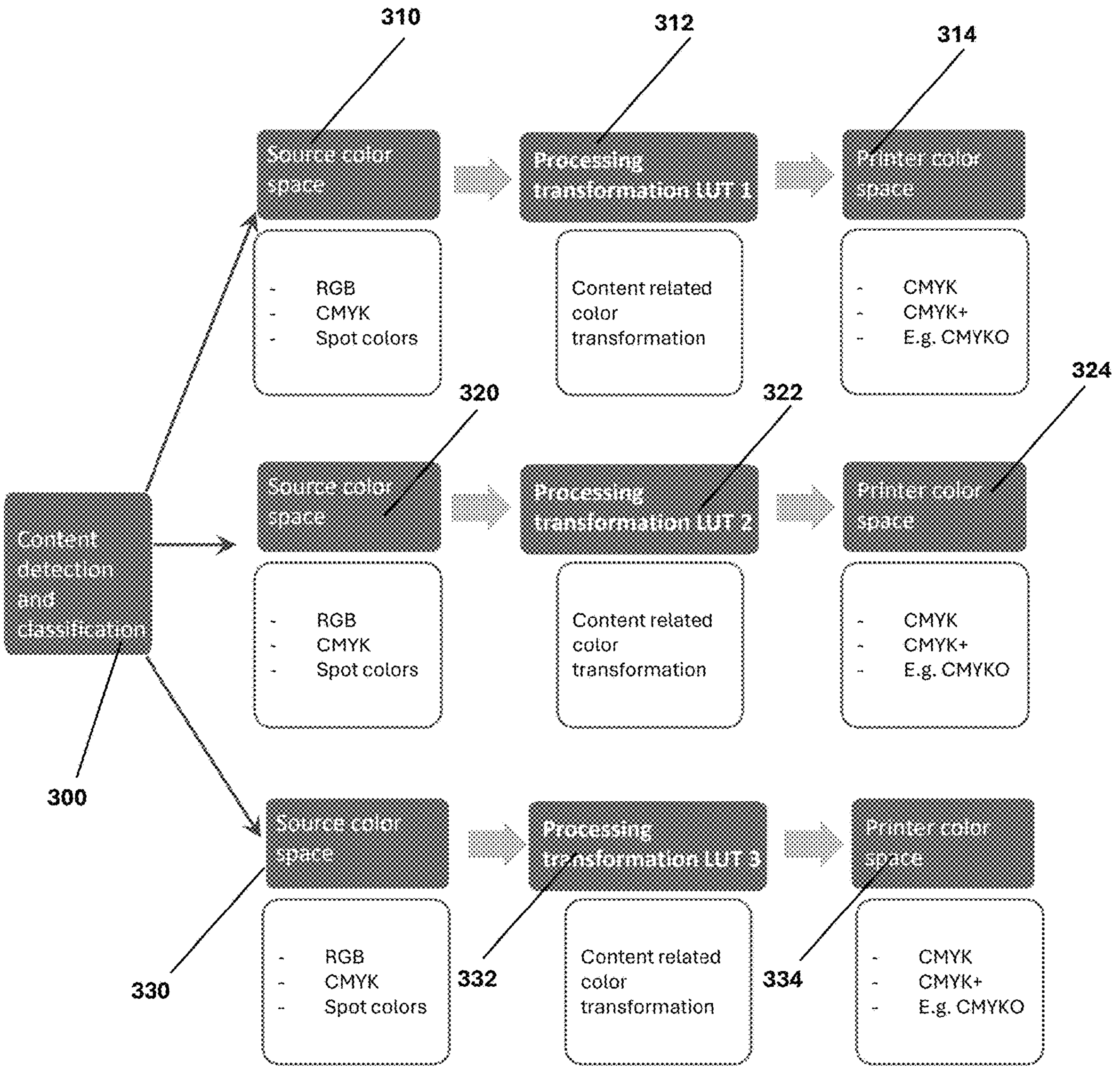
FIG. 3 is a flow diagram showing a CMM according to an embodiment of the invention.

A color management module (CMM) that uses the classification tags or masks to select the best suited color lookup table automatically and then applies this table during color conversion to the color space of the printing device. FIG. 3 is a flow diagram showing a CMM according to an embodiment of the invention. In FIG. 3, content detection and classification is performed 300 (see FIG. 2 above). Outputs 310, 320, 330 are produced in the source color space, e.g. RGB, CMYK, spot colors. A processing transformation is performed to produce look up tables, e.g. LUT1 (312), LUT2 (322), and LUT3 (332), which contain content related color transformation information. The look up tables are used to map the content related color transformations to a printer color space 314, 324, 334, e.g. CMYK, CMYK+, CMYKO.

Figure 4:
FIG. 4 shows an input picture containing images to be classified.

Referring again to FIG. 1, an input picture containing images to be classified 100 (see FIG. 4) is provided to a convolutional neural network (CNN) 110 that is trained on classification and/or semantic classification of objects within the image. The CNN training process is performed using large sets of categorized images that are used for training, test, and validation of the results. The convolutional neural network produces classified and segmented images of elements found in the image 120, e.g. a wine glass (see FIG. 5). If the CNN is able to identify a pre-learned object type in an image with a certain confidence level, it can draw a contour around this object and fill this area with a mask color. This results in mask data for using default rendering intent 130 e.g. photo-realistic (see FIG. 6) and mask data for using dedicated rendering intent 140, e.g. maximum gamut (see FIG. 7).

Figure 5:
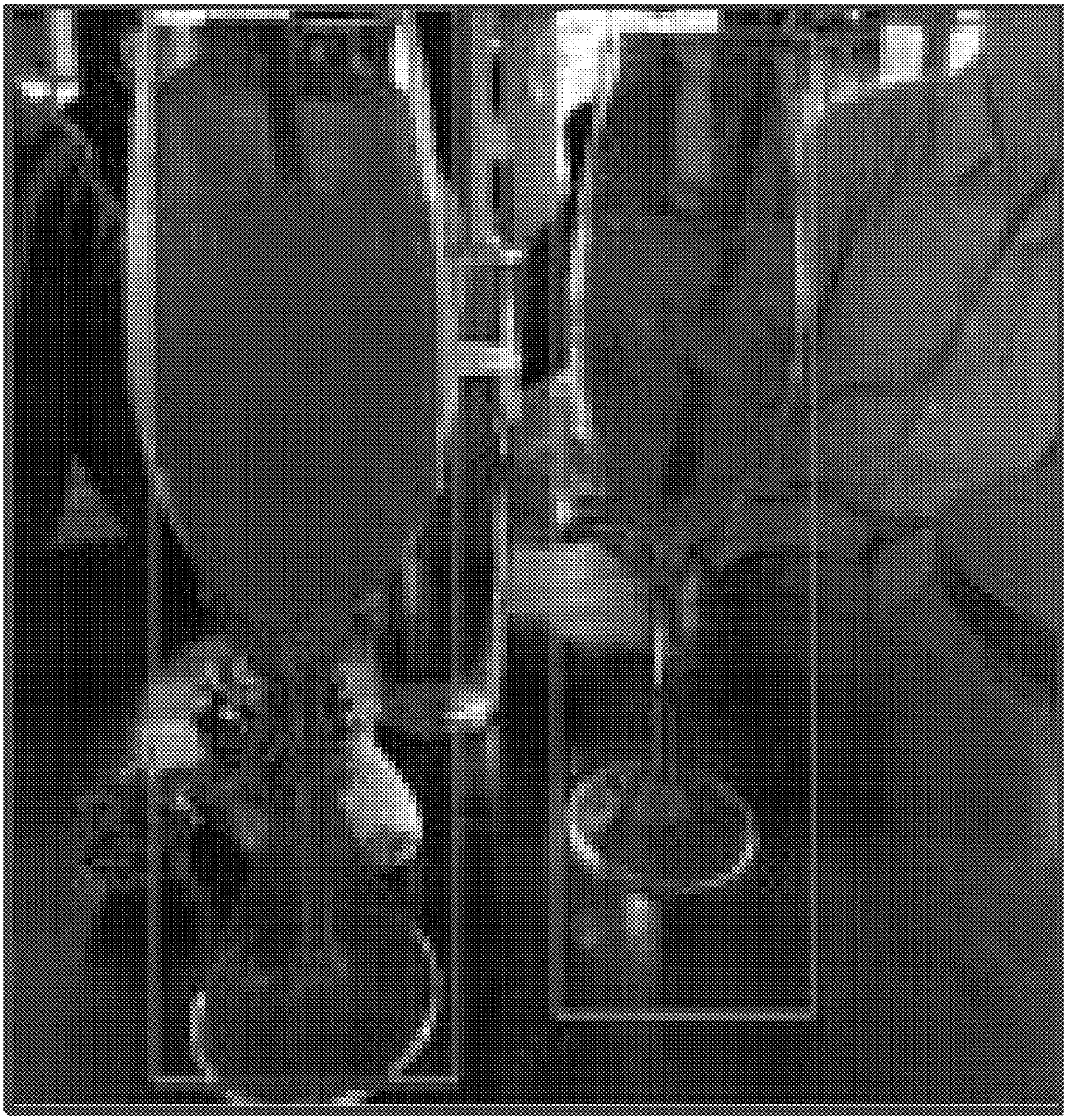
FIG. 5 shows classified and segmented images found on picture, e.g. a wine glass, according to embodiments of the invention.
Figure 6:
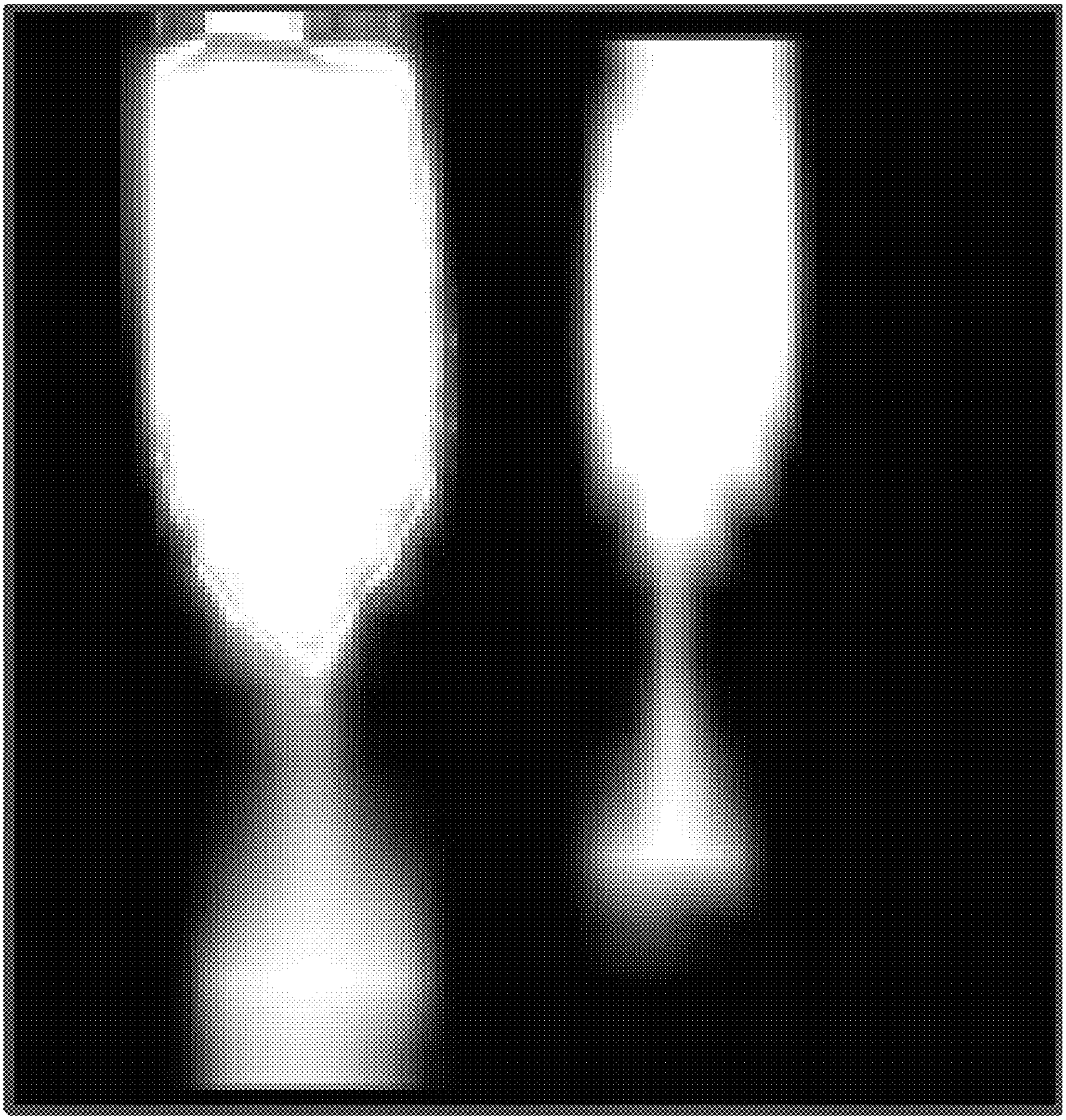
FIG. 6 shows mask data for using default rendering intent, e.g. photo-realistic, according to embodiments of the invention.
Figure 7:
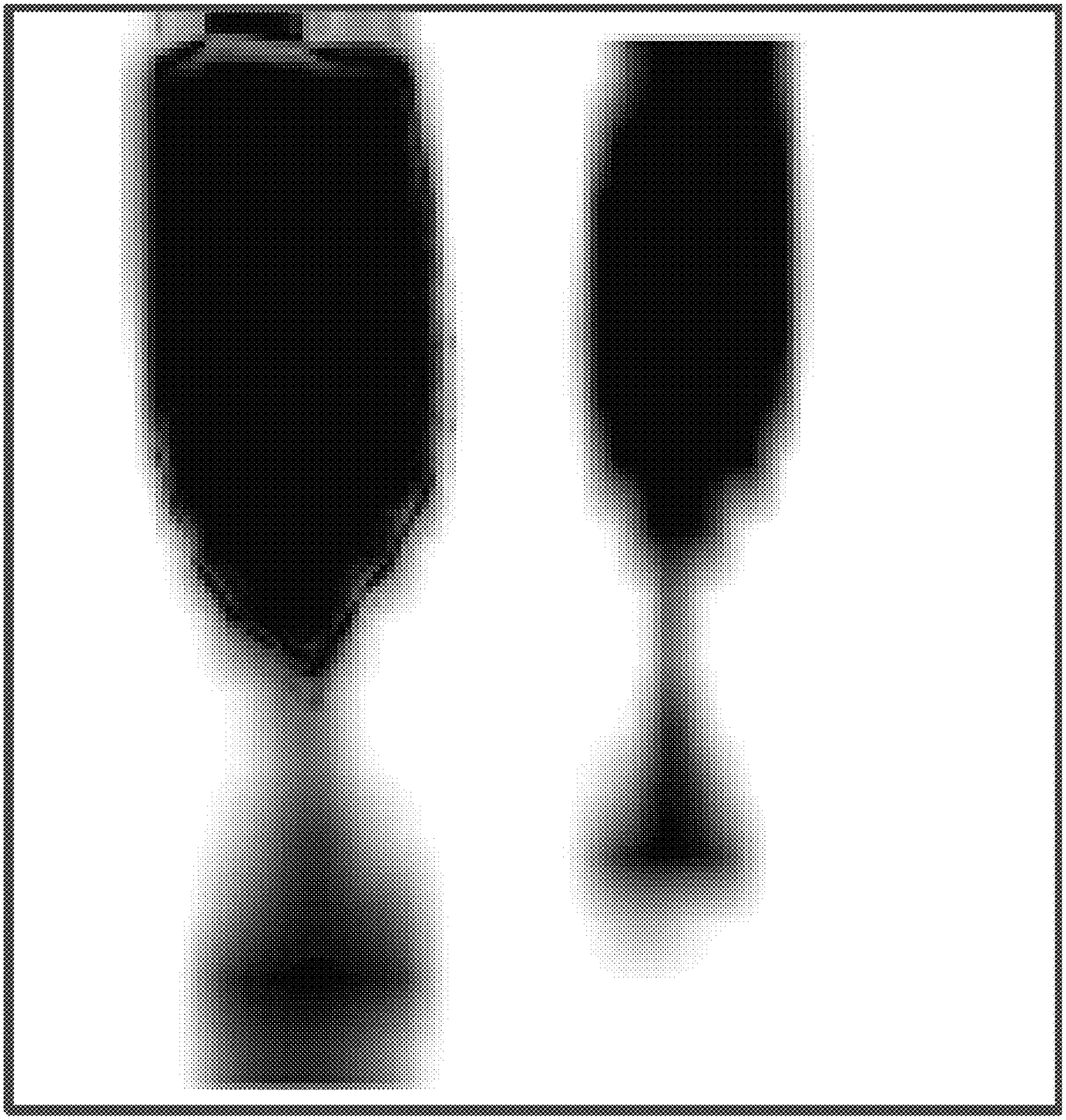
FIG. 7 shows mask data for using dedicated rendering intent, e.g. maximum gamut, according to embodiments of the invention.
Figure 8:
FIG. 8 shows a printout combining both rendering intents according to embodiments of the invention.

In particular, FIG. 5 shows the mask that was created by the convolutional network by applying segmentation, colored in blue; FIG. 6 shows the extracted mask layer for the dedicated rendering intent; FIG. 7 shows the mask layer for the default rendering intent (created by inverting the mask layer from FIG. 6); FIG. 8 shows the resulting image for the case, that the default rendering intent contains a color lookup table that applies a strong de-saturation of the image data. This means, in the resulting image everything outside the segmented object (wine glasses) is printed in gray colors.

The mask data for using default rendering intent and the mask data for using dedicated rendering intent are input to a color management module (CMM) 150 which produces a printout that combines both rendering intents 160 (see FIG. 8).

Figure 9A:
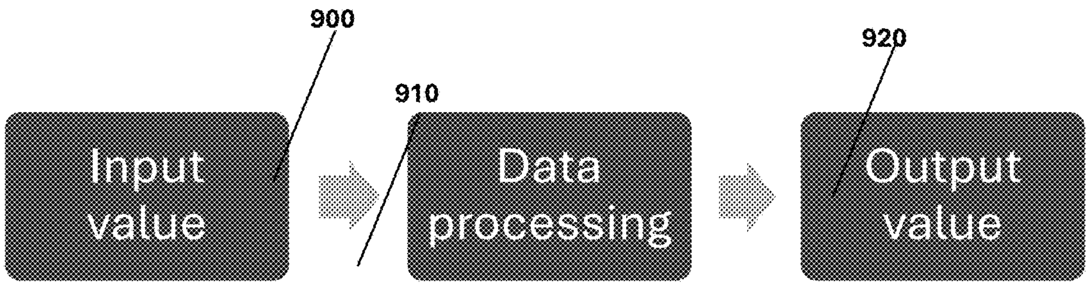
FIGS. 9A-9C are block diagrams showing rendering processes according to embodiments of the invention.
Figure 9B:
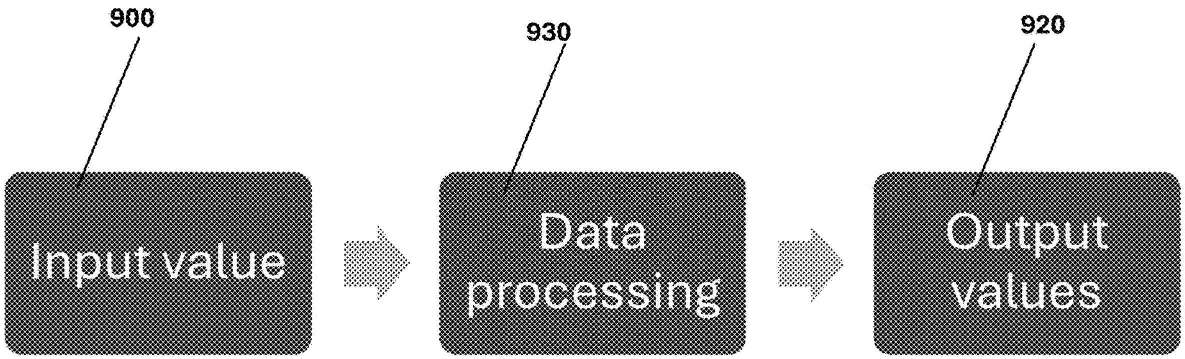
Figure 9C:
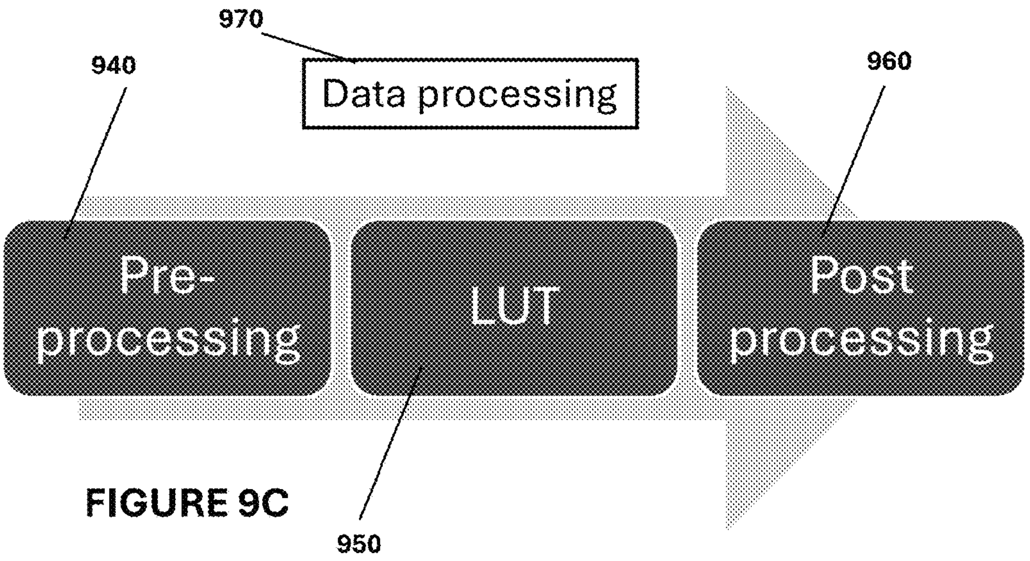

FIGS. 9A-9C are block diagrams showing rendering processes according to embodiments of the invention.

In the standard color rendering process (FIG. 9A) an input is provided 900 and data processing 910 occurs in the CMM module which applies standardized color routines, e.g. color rendering using relative rendering intent to produce an output 920. The implementation in the data processing chain is not different for masked and not masked data. That is, there is little or no difference in general between the processes.

If a data is not masked and a standard color management process is applied, the process proceeds as performed in the state of the art. The CMM operates as in the state of the art and the calibration and ink limiting processes are applied.

If a data is masked, from a high level, the same process is applied but what the process does is different. Imagine a rendering with a different rendering intent. The data can be rendered relatively and whatever is defined in the LUT can be applied to the data, or the data can be rendered perceptually and the CMM applies this to the data.

This is the very basic implementation. Embodiments of the invention build items around this implementation, such as sharping, replacement of colors, other elements. In any case, there is an input value, a processing step which converts this input value, and a resulting output value. Accordingly, the processing appears to be the same all the time but the elements of the processing block differ.

FIG. 9B shows a content dependent color rendering process. The processing chain with or without content related data processing can be identical for the previous block related to the detected content but from the high-level, the same steps are applied, i.e. an input is provided 900, data processing occurs 930, and an output is produced 920.

With the content related data processing more extended data processing is possible, see FIG. 9C. In this case, data processing 970 can include pre-processing 940, access to a look up table 950, and post processing 960. These steps can apply sharpening, color replacement, or other steps as post or pre-processes, tailored to the content.

Computer Implementation

Figure 10:
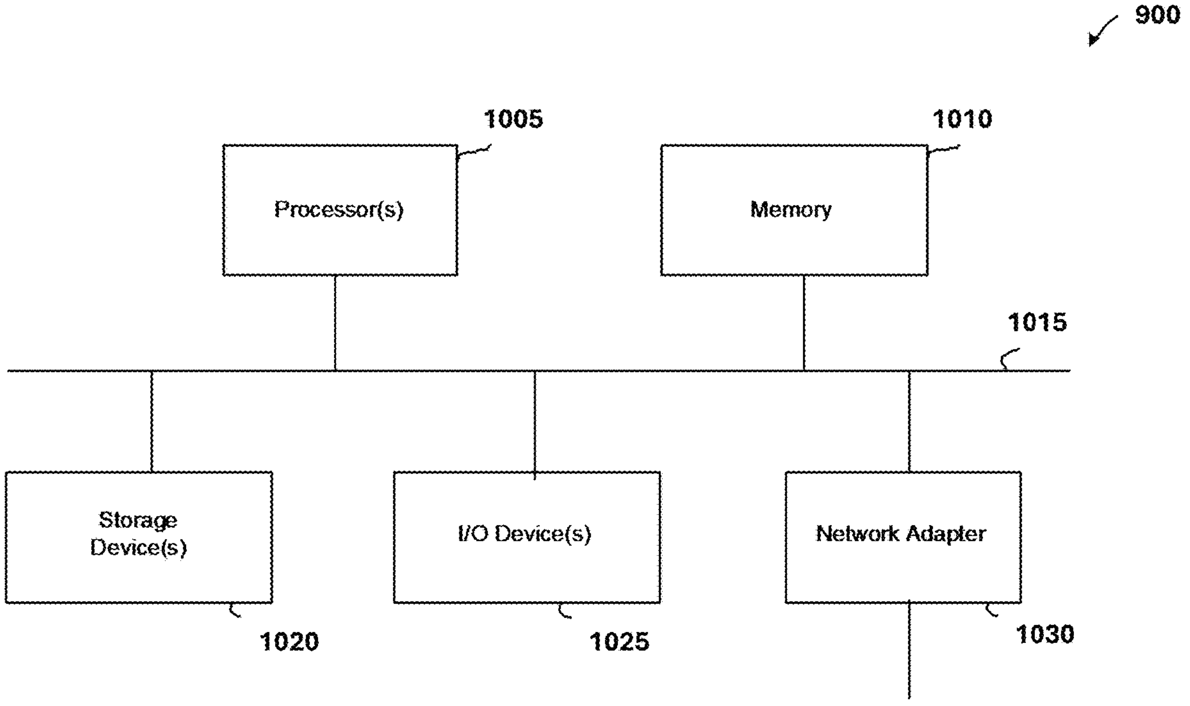
FIG. 10 is a block diagram of a computer system as may be used to implement certain features of some of the embodiments.

FIG. 10 is a block diagram of a computer system as may be used to implement certain features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 1000 may include one or more central processing units ("processors") 1005, memory 1010, input/output devices 1025, e.g. keyboard and pointing devices, touch devices, display devices, storage devices 1020, e.g. disk drives, and network adapters 1030, e.g. network interfaces, that are connected to an interconnect 1015. The interconnect 1015 is illustrated as an abstraction that represents any one or more separate physical buses, point to point connections, or both connected by appropriate bridges, adapters, or controllers. The interconnect 1015, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called Firewire.

The memory 1010 and storage devices 1020 are computer-readable storage media that may store instructions that implement at least portions of the various embodiments. In addition, the data structures and message structures may be stored or transmitted via a data transmission medium, e.g. a signal on a communications link. Various communications links may be used, e.g. the Internet, a local area network, a wide area network, or a point-to-point dial-up connection. Thus, computer readable media can include computer-readable storage media, e.g. non-transitory media, and computer-readable transmission media.

The instructions stored in memory 1010 can be implemented as software and/or firmware to program the processor 305 to carry out actions described above. In some embodiments, such software or firmware may be initially provided to the processing system 1000 by downloading it from a remote system through the computing system 1000, e.g. via network adapter 1030.

The various embodiments introduced herein can be implemented by, for example, programmable circuitry, e.g. one or more microprocessors, programmed with software and/or firmware, or entirely in special purpose hardwired (non-programmable) circuitry, or in a combination of such forms.

Special-purpose hardwired circuitry may be in the form of, for example, one or more ASICs, PLDs, FPGAs, etc.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

The invention claimed is:

1. A computer implemented method for image classification for color management in printing, comprising:

creating ICC color profiles or similar, containing color lookup tables (CLUTs) that describe gamut mapping of input colors to output colors, wherein said CLUTs are created for different applications;

using a convolutional neural network (CNN) that is trained to perform image classification and object detection to analyze and tag images to be printed and/or to mask part of said images to be printed with a classification category;

a color management module (CMM) using said classification tags or masks to select a best suited color lookup table automatically; and said CMM applying said table during color conversion to a color space of a printing device.

2. The method of claim 1, wherein said CLUTs are created for any of a table for best reproduction of photographic images, for office applications, best numerical color match, technical equipment, people, and nature.

* * * * *